Feb. 6, 1968  KIMIKAZU AZUMA  3,368,008
METHOD FOR PRODUCING FOAMABLE THERMOPLASTIC
RESIN COMPOSITION
Filed July 6, 1964  2 Sheets-Sheet 1

INVENTOR.
KIMIKAZU AZUMA
BY
Woodhams, Blanchard & Flynn
ATTORNEYS 3,368,008
**METHOD FOR PRODUCING FOAMABLE THERMO-
PLASTIC RESIN COMPOSITION**
Kimikazu Azuma, 6703 Kugenuma, Fujisawa-shi,
Kanagawa-ken, Japan
Filed July 6, 1964, Ser. No. 380,586
Claims priority, application Japan, Jan. 9, 1964,
39/2,738
11 Claims. (Cl. 264—53)

ABSTRACT OF THE DISCLOSURE

A method and an apparatus for manufacturing a foamable resin composition, in which a thermoplastic resin is melted in an extruding apparatus of a known type, the molten resin is then supplied to a heated, upright mixing chamber having therein a horizontal perforate plate so as to cause the molten resin to flow downwardly through the perforations into a zone located below the perforated plate in the form of numerous fine streams of the molten resin, and a foaming agent is mixed into said molten resin streams as they pass downwardly through said zone.

This invention relates to a method and an apparatus for producing a foamable, homogeneous resin composition from thermoplastic resins, especially from polystyrene, and copolymers and blends thereof with other thermoplastic resins.

Various methods have been proposed to obtain foamable compositions of thermoplastic resins. The most commonly utilized method comprises the steps of first mixing the thermoplastic resin with additives, such as a plasticizer, a pigment, a flame-resistant agent, a foaming agent, which is commonly a fluid, and other necessary ingredients; and thereafter supplying the resulting mixture to an extruding apparatus to effect the melting of the resin and the dispersion of the additives in the molten resin.

However, when a liquid additive is mixed with granular thermoplastic resin, the resin granules will slip with respect to the extruding screw and the forwarding of the resin granules through the extruder will not be efficient.

In another method according to which the additional ingredients are fed under pressure into the molten resin in an extruder, there are also considerable problems, including the difficulty of uniformly dispersing the fluid foaming agent into the molten and thus highly viscous resin, and the problem of clogging of the inlet for the foaming agent which is caused by the sticking thereto of the molten resin mass which fills up the extrusion chamber and is under high pressure.

In a recently proposed method for overcoming the above-mentioned problems, it has been suggested that the extruder be divided into three zones, namely, a plasticizing zone, a feeding zone and a diffusing or cooling zone, which zones have different structures, and especially wherein special equipment is provided in the feeding zone in order to prevent the molten resin mass from flowing reversely into the inlet for the volatile fluid foaming agent. This melting and extruding apparatus has a very complex structure.

The present invention is concerned with the provision of an improved, efficient method and apparatus for continuously preparing molten resin compositions for the manufacture of high quality foamed polystyrene, which method and apparatus are free from the defects described above.

An object of the present invention is to provide a process for feeding and uniformly dispersing fluid-type foaming agents into molten thermoplastic resin. Another object is to simplify the structure of the feeding equipment to be used in such a process by means of an improved injection device by which a fluid foaming agent can be easily dispersed in the molten resin.

The method of this invention comprises mixing a thermoplastic resin with the desired or necessary ingredients, as mentioned above, for making a foamable resin composition passing the mixture through an extruder for melting the mixture, feeding the molten resin mass in the form of a multitude of streams into a chamber, feeding the foaming agent into the upper part of the chamber and into contact with the resin streams, blending the foaming agent with the resin in the lower part of the chamber, and then forcing the molten resin mass thus homogeneously mixed with the foaming agent by means of a screw into a cooled extruder for cooling the molten mixture. The present invention includes also an apparatus for performing such a process.

The present invention will be further explained with reference to the accompanying drawings.

Figure 1:
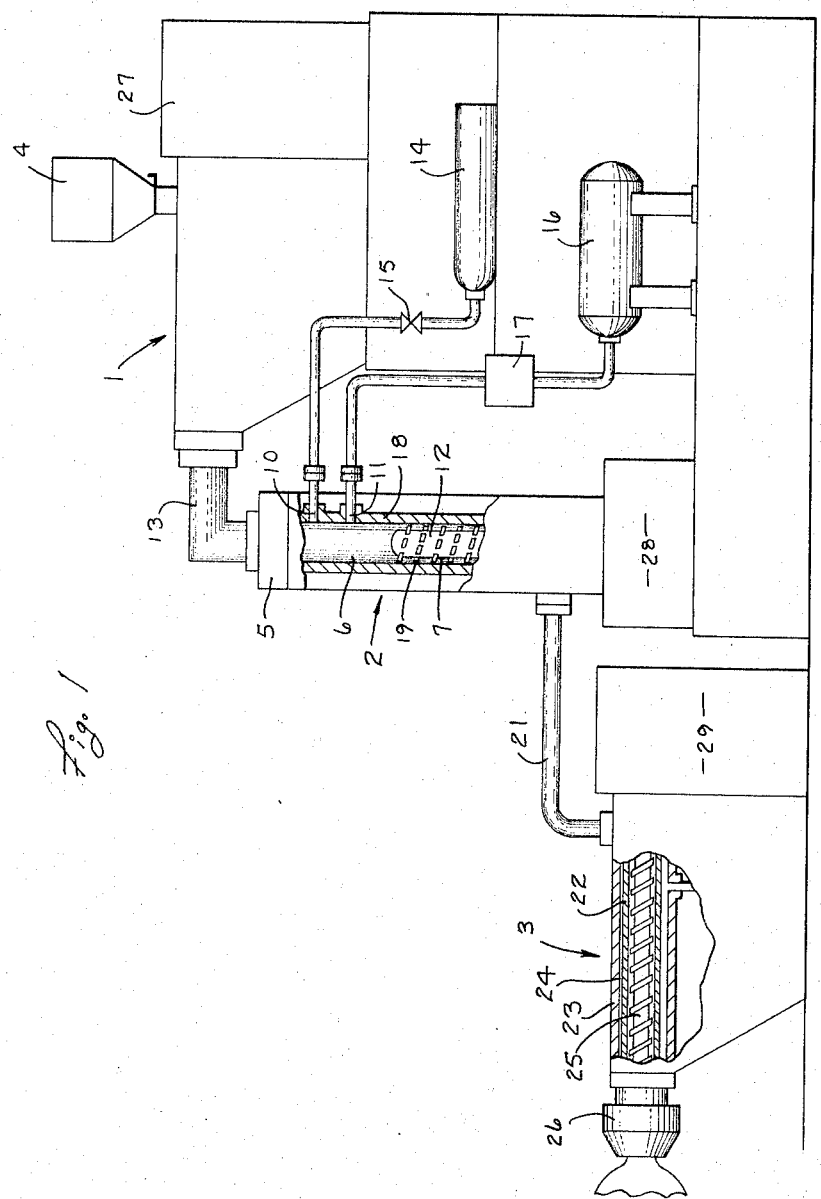
FIGURE 1 is an elevational view, broken away in parts, of an apparatus according to the present invention.
Figure 2:
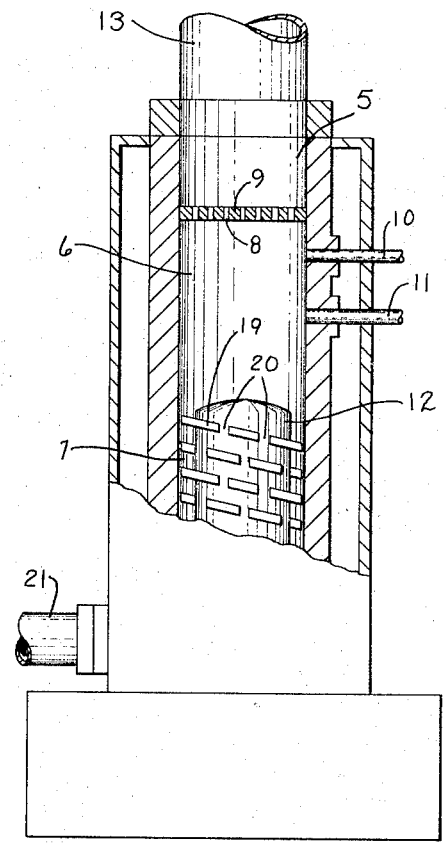
FIGURE 2 is an enlarged view of a fragment of FIGURE 1.

The apparatus shown in FIGURES 1 and 2 comprises three main parts, namely, a first extruder 1 for melting and extruding the resin mixture, a chamber 2 in which the foaming agent is fed into and mixed with the resin and a cooled extruder 3 for cooling the molten mixture.

The thermoplastic resin mixture which was prepared by blending the required additional ingredients by a suitable apparatus, such as a ribbon blender (not shown), is charged through a hopper 4 into the extruder 1. The extruder is horizontally arranged and is designed in such a manner that the root diameter of the screw thereof increases to compensate for changes in viscosity and volume due to heating of the resin, and the outside of the cylinder thereof is surrounded by heating equipment of any suitable type. The mixture of the resin and other modifying ingredients is melted by being heated to an appropriate temperature in the extruder 1 and then it is fed through a short conduit 13 into the chamber 2.

The chamber 2 is in the shape of a vertical tower and it consists of the following three zones; an upper pressure zone 5 which extends downwardly from the lower end of conduit 13 and at the lower end of which there is provided a perforated plate 9, an intermediate injection zone 6 in the side wall of which are provided inlets 10 and 11 for inert gas and foaming agent, respectively, and a lower mixing zone 7. A screw 12 is provided in the mixing zone 7 thoroughly mixing the molten resin mass. The temperature in the chamber 2 is freely adjustable by means of electrical heating bands (not shown) disposed around it. The molten resin mass fed into the pressure zone 5 is heated therein in order to decrease its viscosity, and then it flows downwardly in fine thread-like streams through the small holes 8 in the plate 9 into the intermediate zone 6. In order to prevent the gaseous foaming agent from flowing backwardly through the molten resin mass into the pressure zone 5, the diameter of the holes 8 is preferably as small as possible.

The intermediate zone 6 is maintained at a high temperature, and additionally at a substantially constant high pressure by the inert gas which is forced thereinto from a high pressure bomb 14 through a reducing valve 15. The fluid foaming agent from a tank 16 is fed by a high pressure pump 17 to the inlet 11 and thence flows into the intermediate zone 6. The foaming agent immediately after it enters the zone 6 vaporizes because of high temperature therein and, thus, the streamlets of the melted resin flowing downwardly absorb the gaseous foaming agent in contact therewith. These streamlets thereafter move into the upper part of the mixing zone 7. The fact that, as mentioned above, the molten resin mass flows downwardly in the form of streamlets of small diameter in the intermediate zone 6 makes the surface area thereof exposed to the foaming agent greater and thus, a better absorbing effect can be obtained. Moreover, because the inlets 10 and 11 for the inert gas and the foaming agent are placed in the sidewall 18 of the intermediate zone 6 out of contact with the streamlets of the molten resin mass, which resin would otherwise enter into said inlets, clogging of said inlets by the molten resin does not take place. Both inlets 10 and 11 are preferably disposed at the upper part of the intermediate zone 6 so that the molten resin remaining for awhile in the upper part of the mixing zone 7 does not contact same.

The screw 12 has flights 19 which are interrupted by equally spaced slots 20 which extend axially through the flights and which are circumferentially offset so that the slots 20 in adjacent flights are out of axial alignment. The molten resin mass in the upper part of the mixing zone 7 is pushed by inert gas from the intermediate zone 6 and passes along the flights 19 and through the slots 20 of the rotating screw 12. Thus, the molten resin flows through an irregular tortuous path so that it is thoroughly mixed. The resin is then forced by the pressure of the inert gas through a conduit 21 into the cooled extruder 3.

The conduit 21 consists of spaced-apart, concentric inner and outer tubes. The molten resin flows through the inner tube and a suitable cooling fluid flows through the space between the inner and outer tubes. Thus, preliminary cooling of the molten resin mass takes place as the resin passes through the tube 21. The extruder 3 includes an outer jacket 23 surrounding an inner cylinder 22. In the space 24 between the cylinders, warm water is continuously circulating so as to control the temperature of the material flowing through the inner cylinder. After being cooled by the warm water to a temperature suitable for foaming purposes, the homogeneous molten resin mass is moved forwardly under the action of a horizontal screw 25 in the cylinder 22. This resin mass is extruded through a forming die 26 into the atmosphere to form foamed products, such as film, sheet, etc., said forming die being designed in accordance with the desired shape of the product to be formed. The parts designated by the numerals 27, 28 and 29 in the drawing (FIGURE 1) identify the mechanisms for driving the screws in the extruder 1, chamber 2 and cooled extruder 3, respectively.

The foamable raw resins to be used in the present invention include polystyrene, or copolymers of styrene and other monomers, such as acrylonitrile or butadiene, or blends of polystyrene and other polymers such as polyethylene, polyvinyl chloride, polyacrylonitrile, polyamides, polyesters, vinyl acetate or polypropylene, or scraps of polystyrene or foamed polystyrene.

As the foaming agent, there can be used gaseous agents, such as propane, and fluid agents, such as pentane, butane or hexane, mixtures thereof and solid forming agents. Moreover, a mixture, prepared by dissolving a polystyrene of low molecular weight in a fluid foaming agent, such as methylene chloride and petroleum ester, which are solvents for polystyrene, and, thereafter, mixing a solid foaming agent therein, can be used as well. Such a mixture has the advantage that the mixed solid foaming agent can be dispersed homogeneously in the fluid agent without precipitating the solid agent because of the substantial increase of the viscosity of the above fluid foaming agent. Furthermore, plasticizers, such as dioctylphthalate, can be used by adding same simultaneously with the fluid foaming agent.

For the purpose of making the size of cells in the foamed product uniformly small, a small amount of fine powder, such as titanium white or perlite, can be mixed as a nucleus material with the raw feed resin prior to being supplied to the extruder 1.

Typical examples of the practice of the present invention are described in the following:

*Example 1*

The raw mixture which was prepared by blending 100 parts (by weight) of polystyrene particles and 2 parts by weight of titanium white in a ribbon blender was charged through the hopper into the extruder 1. The extruder had a plurality of zones maintained at temperatures 35°, 80°, 130° and 160° C. so that the raw mixture as it flowed therethrough was melted and the thus melted resin mass was pushed by the screw into the chamber 2. In the chamber 2 which was maintained at a temperature from 190° to 220° C., the molten resin mass was heated to 200° C. With the resultant decrease in the viscosity of the resin, it flowed down through the small holes 8 in the bottom of the upper zone 5, said holes having a diameter of 0.5 mm., and exited therefrom in the form of a multiplicity of thread-like streams, into the intermediate zone 6, which was kept at a pressure 250 kg./cm.$^2$ by the inert (nitrogen) gas supplied from the presure bomb 14 (300 kg./cm.$^2$). 3% by weight, based on the resin material, of pentane was fed through the inlet 11 by the pump 17. The pentane vaporized immediately into the gaseous state and thus, adhered to the nuclei in the melted resin mass and was dispersed homogeneously therein. After having been blended by the pressure of nitrogen gas and by the action the screw in the mixing zone 7 of the chamber 2, the molten resin mass containing pentane was forced through the conduit 21 into the cooled extruder 3. The molten resin mass forwarded through the cooling extruder 3 was cooled by warm water circulated in the jacket, so that the resin mass reached a temperature from 85° to 95° C. near the outlet thereof, and it finally was extruded with foaming action through a circular die by the ordinary inflation method. Film products of fine quality were obtained.

*Example 2*

With the same apparatus and also under the same conditions as in Example 1, a homogeneous foamable resin material was obtained from a mixture composed of 50 parts (by weight) of polystyrene, 50 parts of powdered scrap of foamed polystyrene and 25 parts of fine powder (300 mesh) of perlite, with the addition of 3% by weight of pentane based on the total amount of resin used.

*Example 3*

With the same apparatus and also under the same conditions as in Example 1, a homogeneous foamable resin material was obtained from a mixture composed of 60 parts (by weight) of polystyrene, 40 parts of a copolymer of acrylonitrile, butadiene and styrene and 25 parts of perlite fine powder, with addition of 5% by weight of pentane based on the total amount of resin used, which foamable resin composition was extruded, expanded and cooled, and a foamed sheet product of 50 mm. thickness containing fine cells was obtained.

*Example 4*

With the same apparatus and also under the same conditions as Example 1, a resin composition of good foamability was obtained from a mixture composed of 70 parts (by weight) of polystyrene, 30 parts by weight of polyethylene and 2 parts by weight of perlite fine powder, with the addition of 5% by weight of pentane based on the total amount of resin used.

Although particular, preferred embodiments of the invention have been disclosed herein for illustrative purposes, it will be understood that modifications or variations of such disclosure which lie within the scope of the appended claims, are fully contemplated.

What is claimed is:
1. A process for the manufacture of foamable thermoplastic resin compositions, the steps comprising:
   feeding thermoplastic resin into an extruder;
   continuously forwarding said thermoplastic resin through said extruder and melting said thermoplastic material as it flows through said extruder;

continuously flowing the melted thermoplastic resin discharged from the extruder downwardly and dividing the melted thermoplastic resin into a multitude of downwardly moving separate spaced-apart streams of small cross-sectional area as the thermoplastic resin flows downwardly;

flowing said streams downwardly through an upright elongated chamber in spaced relationship to one another with free spaces existing between and substantially completely surrounding the individual streams;

injecting a foaming agent into the upper portion of the chamber so that the foaming agent moves into the free spaces between said streams and the foaming agent substantially uniformly contacts each stream and is absorbed thereby;

mechanically blending and mixing the streams and the foaming agent in the lower portion of the chamber to form a homogeneous mass; and discharging the homogeneous mass from the lower end of the chamber and then shaping the homogeneous mass.

2. A process according to claim 1, in which the foaming agent is a liquid and including a further step of vaporizing the foaming agent injected into the chamber whereby said agent contacts and is uniformly absorbed by the streams.

3. A process according to claim 1, further including the step of heating said melted thermoplastic resin so as to reduce its viscosity before said resin is divided into individual streams.

4. A process according to claim 1, including the additional step of subjecting the homogeneous melted mass to a gaseous pressure by means of an inert gas contained within the spaces between the streams for forcing the mass into a cooled extruder so that the temperature of the homogeneous mass is reduced to a temperature suitable for molding and then extruding the homogeneous mass through a die.

5. An apparatus for the manufacture of foamable thermoplastic resins, comprising:

an extruder for melting a thermoplastic resin;

wall means defining an upright chamber having an inlet at the upper end thereof and an outlet at the lower end thereof, said inlet being connected to the discharge end of said extruder;

stationary perforate means mounted within the chamber adjacent and spaced downwardly from the inlet for dividing the melted thermoplastic resin into a plurality of small, vertically downwardly flowing streams with said streams being spaced one from another;

blending means mounted within said chamber spaced downwardly from said perforate means;

the space within said chamber between said perforate means and said blending means being unobstructed and forming an open injection zone, said streams flowing downwardly through said zone with free spaces existing between and substantially completely surrounding the individual streams within the injection zone;

injection means for supplying a foaming agent through said wall means into said injection zone whereby said agent uniformly contacts and is absorbed by said streams, said melted thermoplastic resin and foaming agent then moving through said blending means so that they are formed into a homogeneous mass; and shaping means connected to said outlet.

6. An apparatus according to claim 5, wherein said perforate means comprises horizontal plate means having a plurality of small perforations therethrough.

7. An apparatus according to claim 5, wherein said blending means comprises a rotatable mixing member having a plurality of radially extending mixing elements thereon.

8. An apparatus according to claim 5, wherein said blending means comprises a screw member having spiral flights thereon, said flights having slots cut therethrough, said slots being circumferentially offset so that slots in adjacent flights are out of axial alignment with each other.

9. An apparatus according to claim 5, further comprising means for supplying inert pressurized gas to said injection zone, said pressurized gas acting on the molten mass for forcing same through the blending means and thence through the outlet.

10. An apparatus according to claim 5, wherein said chamber is provided with an injection inlet vertically positioned between said perforate means and said blending means, said inlet communicating directly with said injection zone.

11. An apparatus according to claim 5, wherein said shaping means includes extruder means for cooling said homogeneous mass; and means interconnecting said chamber outlet to said latter extruder means for supplying said homogeneous mass thereto.

References Cited

UNITED STATES PATENTS

| 2,669,751 | 2/1954 | McCurdy et al. | |
| 2,785,455 | 3/1957 | McElroy | 18—2 X |
| 3,067,462 | 12/1962 | Kullgren. | |
| 3,121,911 | 2/1964 | Lightner | 264—95 X |
| 3,160,688 | 12/1964 | Aykanian et al. | 264—53 |
| 3,287,477 | 11/1966 | Vesilind | 264—53 |

FOREIGN PATENTS 542,142 4/1956 Italy.

ALEXANDER H. BRODMERKEL, *Primary Examiner.*

P. E. ANDERSON, *Assistant Examiner.*